(12) United States Patent
Suzuki

(10) Patent No.: US 7,612,940 B2
(45) Date of Patent: Nov. 3, 2009

(54) DIFFRACTIVE OPTICAL ELEMENT AND METHOD OF FABRICATING DIFFRACTIVE OPTICAL ELEMENT

(75) Inventor: Kenzaburo Suzuki, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 174 days.

(21) Appl. No.: 11/390,279

(22) Filed: Mar. 28, 2006

(65) Prior Publication Data

US 2006/0171031 A1 Aug. 3, 2006

Related U.S. Application Data

(63) Continuation of application No. PCT/JP2004/014706, filed on Sep. 29, 2004.

(30) Foreign Application Priority Data

Sep. 30, 2003 (JP) ............................ P2003-342059

(51) Int. Cl.
*G02B 5/18* (2006.01)
*G02B 27/44* (2006.01)
(52) U.S. Cl. ...................... 359/569; 359/576; 359/566
(58) Field of Classification Search ................. 359/576, 359/566, 569
See application file for complete search history.

(56) References Cited

U.S. PATENT DOCUMENTS

| 5,734,502 | A | 3/1998 | Ebstein | |
| 5,847,877 | A | 12/1998 | Imamura | |
| 6,268,969 | B1* | 7/2001 | Ogawa | 359/745 |
| 6,392,805 | B1 | 5/2002 | Ohmori | |
| 6,480,332 | B1* | 11/2002 | Nakai | 359/566 |
| 6,573,348 | B2* | 6/2003 | Yokoyama et al. | 526/286 |
| 6,671,096 | B2 | 12/2003 | Ohmori | |
| 6,826,344 | B2* | 11/2004 | Shimada et al. | 385/129 |
| 2001/0015848 | A1 | 8/2001 | Nakai | |
| 2002/0015231 | A1 | 2/2002 | Ogawa | |
| 2003/0058538 | A1 | 3/2003 | Sugiyama | |
| 2003/0161044 | A1 | 8/2003 | Tokoyoda | |

FOREIGN PATENT DOCUMENTS

| EP | 1 489 440 A1 | 12/2004 |
| JP | 9-127321 A | 5/1997 |
| JP | 10-268116 A | 10/1998 |
| JP | 11-271513 | 10/1999 |
| JP | 11-271513 A | 10/1999 |
| JP | 11-287904 A | 10/1999 |
| JP | 2001-255408 | 9/2001 |
| JP | 2001-255408 A | 9/2001 |
| JP | 2003-98329 A | 4/2003 |
| JP | 2003-227913 | 8/2003 |
| WO | WO 03/079061 A | 9/2003 |

* cited by examiner

*Primary Examiner*—Audrey Y Chang
(74) *Attorney, Agent, or Firm*—Miles & Stockbridge P.C.

(57) ABSTRACT

The present invention is a diffractive optical element 1 in which mutually different materials make contact with one another via the same diffraction grating groove 30. One of the mutually different materials is a first ultraviolet curing resin 10 and the other of the mutually different materials is a second ultraviolet curing resin 20 that is different from the first ultraviolet curing resin 10.

23 Claims, 6 Drawing Sheets

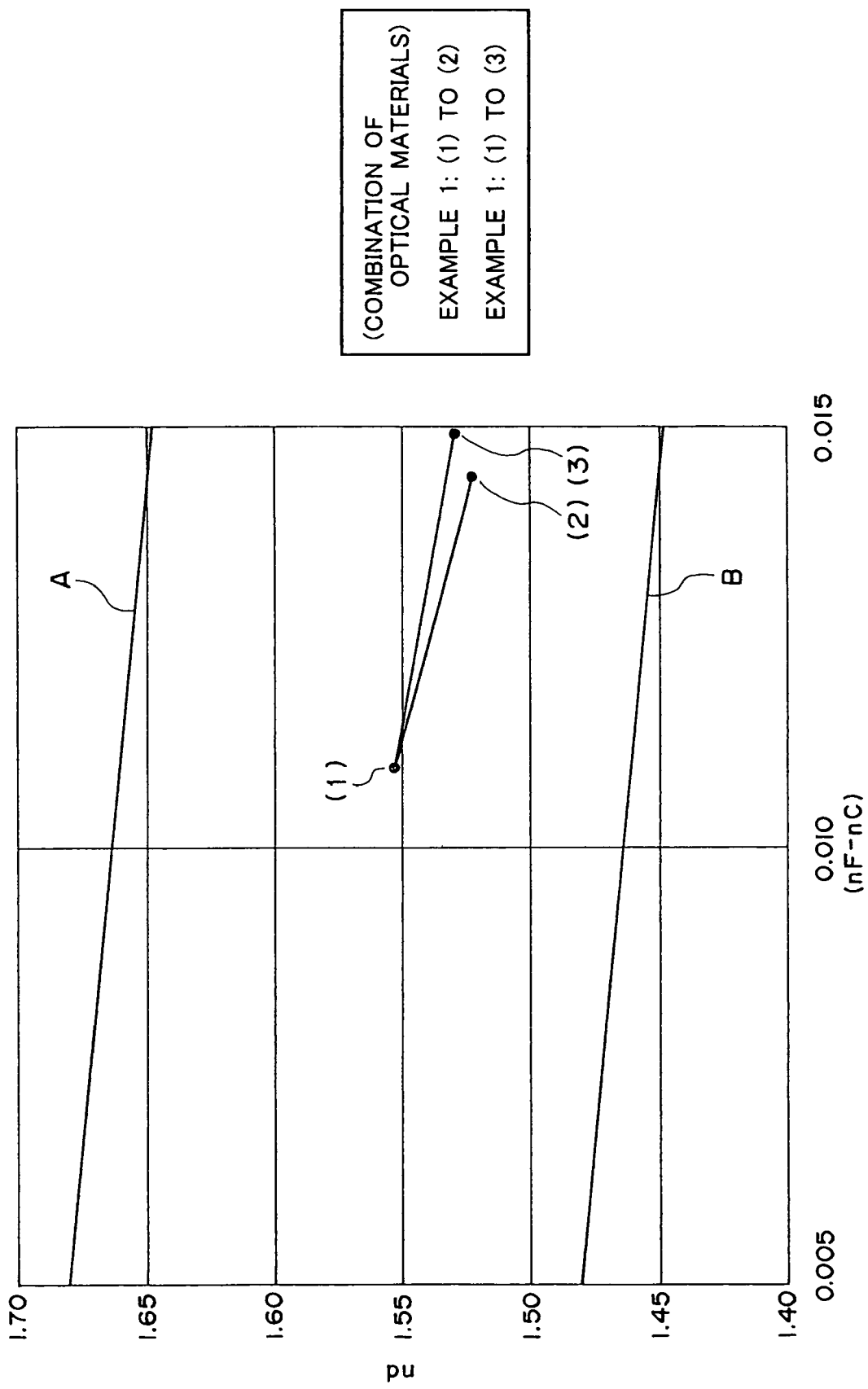

DIFFRACTIVE OPTICAL ELEMENT AND METHOD OF FABRICATING DIFFRACTIVE OPTICAL ELEMENT

This is a continuation of PCT/JP2004/014706 filed on Sep. 29, 2004, which is hereby incorporated by reference.

FIELD OF THE INVENTION

The present invention relates to a diffractive optical element and, more particularly, to a multilayer-type diffractive optical element and fabrication method thereof.

BACKGROUND OF THE INVENTION

A diffractive optical element is an optical element that is made having a slit-like or groove-like grating structure with several hundred or so narrow slits or grooves at equal intervals for each minute interval (approximately 1 mm). The diffractive optical element possesses the quality of producing a diffracted light beam in a direction determined by the wavelength of the light and the pitch (interval) of the slits or grooves when light is irradiated onto the diffractive optical element. Such diffractive optical elements are used in a variety of optical systems. For example, most recently, a diffractive optical element that is used as a lens by concentrating diffracted light of a specified degree to a point, or the like, has been known.

Among such diffractive optical elements, diffractive optical elements known as multilayer-type diffractive optical elements have been proposed in recent years. A diffractive optical element of this type is rendered by stacking a plurality of diffractive optical elements having faces formed with a saw shape and possesses the characteristic of retaining a high diffraction efficiency substantially in the full range of the desired wavelength range (visible light range, for example), that is, of having a favorable wavelength characteristic.

Generally, a so-called bonded multilayer-type diffractive optical element constituted by diffractive device elements of two types that are mutually different materials that is bonded via the same diffraction grating groove, for example, is known as a multilayer-type diffractive optical element (See Japanese Patent Application Laid Open No. H11-271513, for example).

Further, as shown in FIG. 6, as a multilayer-type diffractive optical element of another example, a so-called separate multilayer-type diffractive optical element constituted by a first diffractive device element 110 and a second diffractive device element 120 that are of different materials and in which the facing saw-like faces of the respective diffraction grating elements 110 and 120 are arranged separated with air therebetween is known. Because height d1 of the diffraction grating groove of the first diffractive device element 110 and height d2 of the diffraction grating groove of the second diffractive device element 120 in the separate multilayer-type diffractive optical element are different, molding using dies for forming the respective diffraction grating grooves is performed. In the case of such a separate multilayer-type diffractive optical element, the height d1 of the diffraction grating groove of the first diffractive device element 110 is determined as a predetermined value and the height d2 of the diffraction grating groove of the second diffractive device element 120 is determined as another predetermined value to satisfy the achromatic condition for the two specified wavelengths. As a result, the diffraction efficiency of the two specified wavelengths is 1.0 and a high diffraction efficiency can also be obtained at other wavelengths. Here, in the case of a transparent-type diffraction grating, the diffraction efficiency is the ratio $\eta(=I_1/I_0)$ between the intensity $I_0$ of the incident light and the intensity $I_1$ of first-order diffracted light.

Further, in the case of the bonded multilayer-type diffractive optical element (of Japanese Patent Application Laid Open No. H11-271513), glass is usually used as the material for both the diffraction grating elements constituting the diffractive optical elements, which are made by means of molding using a die in which the diffraction grating grooves are formed, that is, so-called glass-mold molding. However, due to the fabrication time, glass-mold molding has been faced by a multiplicity of technical difficulties such as those of the die molding method, and a glass fabrication method that satisfies requirements.

Further, height d1 of the diffraction grating groove of the first diffractive device element 110 and height d2 of the diffraction grating groove of the second diffractive device element 120 in the separate multilayer-type diffractive optical element (shown in FIG. 6) are different and, because a plurality of dies are required and the diffraction grating elements 110 and 120 must be fabricated separately by means of the same procedure (by using the dies), work is required. In addition, because the two diffractive device elements 110 and 120 must ultimately be fabricated accurately, the diffractive device elements 110 and 120 are extremely hard to make.

SUMMARY OF THE INVENTION

The present invention was conceived in view of such problem and an object of the present invention is to provide a multilayer-type diffraction grating that is easy to manufacture and method of fabricating same.

In order to achieve this object, the diffractive optical element of the present invention is a diffractive optical element in which mutually different materials make contact with one another via the same diffraction grating groove, wherein one of the mutually different materials is a first ultraviolet curing resin and the other of the mutually different materials is a second ultraviolet curing resin that is different from the first ultraviolet curing resin.

Further, the diffractive optical element of the present invention is characterized in that, when the refractive index at line d of the first ultraviolet curing resin is nd1 and the dispersion value of the first ultraviolet curing resin is vd1, the conditions of expressions $1.50 \leq nd1 \leq 1.60$ and $45 \leq vd1 \leq 65$ are satisfied and, when the refractive index at line d of the second ultraviolet curing resin is nd2 and the dispersion value of the second ultraviolet curing resin is vd2, the conditions of expressions $1.45 \leq nd2 \leq 1.55$ and $vd2 \leq 45$ are satisfied. Further, the dispersion value is $vdi=(ndi-1)/(nFi-nCi)$ (where i=1, 2).

Furthermore, the diffractive optical element of the present invention is characterized in that, when the refractive index at line d of the first ultraviolet curing resin is nd1 and the dispersion value of the first ultraviolet curing resin is vd1, the refractive index at line d of the second ultraviolet curing resin is nd2 and the dispersion value of the second ultraviolet curing resin is vd2, the condition of expression $0.0005 \leq (nd1-nd2)/(vd1-vd2) \leq 0.03$ is satisfied.

In addition, the diffractive optical element of the present invention is characterized in that, when the height of the diffraction grating groove is h, the condition of expression $h \leq 50 \ \mu m$ is satisfied.

Moreover, the diffractive optical element of the present invention is characterized in that the minimum pitch of the diffractive optical element is at least 80 μm.

Further, the diffractive optical element of the present invention is characterized in that the sum of the thicknesses on the optical axis of the first ultraviolet curing resin and the second ultraviolet curing resin is no more than 1000 μm.

In addition, the diffractive optical element of the present invention is characterized in that the first ultraviolet curing resin and second ultraviolet curing resin both have a thickness on the optical axis of no more than 500 μm.

Furthermore, the diffractive optical element of the present invention is characterized in that, when the core thickness of the first ultraviolet curing resin is t1 and the core thickness of the second ultraviolet curing resin is t2, the condition of expression 0.2<t1/t2<5.0 is satisfied.

Moreover, the diffractive optical element of the present invention is characterized in that, when the radius of curvature of a substrate that constitutes the diffractive optical element having the first ultraviolet curing resin is R, the condition of expression 0≦1/R<0.1(1/mm) is satisfied.

Further, the diffractive optical element of the present invention is characterized in that, when the refractive index at line d of the first ultraviolet curing resin is nd1, the refractive index at line C is nC1, and the refractive index at line F is nF1, and the refractive index at line d of the second ultraviolet curing resin is nd2, the refractive index at line C is nC2, the refractive index at line F is nF2, and Δnd=nd1−nd2, Δ(Nf−nC)={(nF1−nC1)−(nF2−nC2)}, the condition of expression −10.0<Δnd/Δ(nF−nC)<−1.0 is satisfied.

The method of fabricating a diffractive optical element of the present invention is characterized by comprising the steps of: dropping either one of the first and second ultraviolet curing resins onto a substrate and performing shaping by using a die formed with a diffraction grating groove; irradiating one of the ultraviolet curing resins thus shaped with ultraviolet light and curing the one of the ultraviolet curing resins thus shaped; removing the one of the ultraviolet curing resins thus cured from the die; dropping the other of the first and second ultraviolet curing resins onto the side of the one of the ultraviolet curing resins thus removed where the diffraction grating groove is formed; and irradiating the other ultraviolet curing resin thus dropped with ultraviolet light.

As described hereinabove, the diffractive optical element of the present invention makes it possible to provide a multilayer-type diffractive optical element that is easy to fabricate and a method of fabricating same.

BRIEF DESCRIPTION OF THE DRAWINGS

FIG. 7 is an (nF−nC)/nd map for selecting the material that constitutes the bonded multilayer-type diffractive optical element of the present invention.

DESCRIPTION OF THE PREFERED EMBODIMENTS

Figure 1:
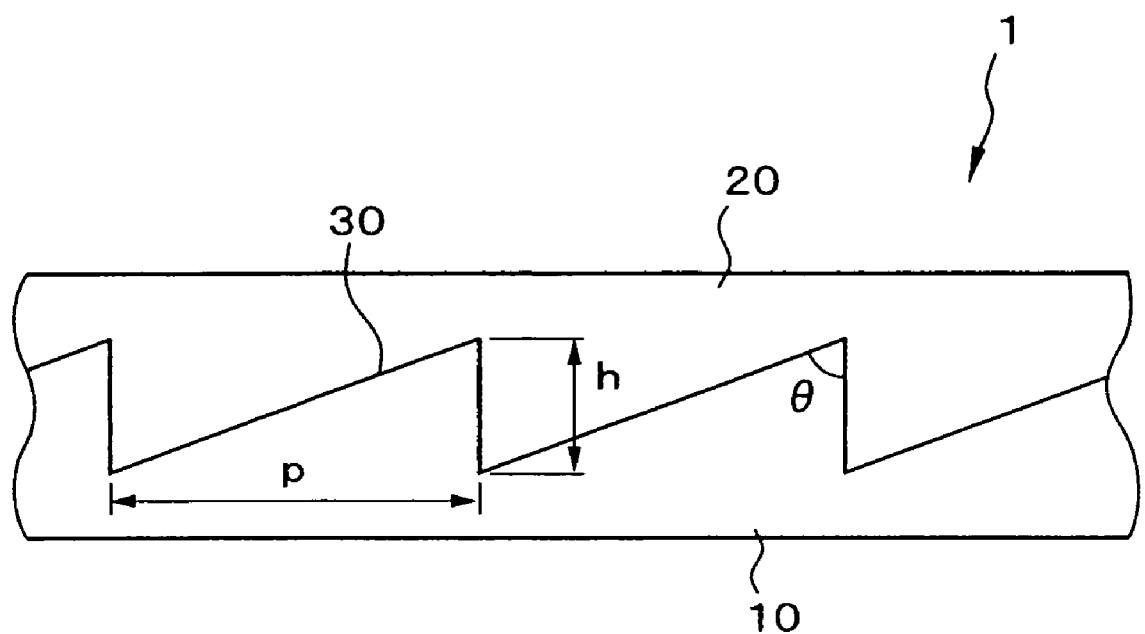
FIG. 1 is a schematic cross-sectional view of a bonded multilayer-type diffractive optical element of the present invention.

Preferred embodiments of the present invention will be described hereinbelow with reference to the drawings. FIG. 1 is a schematic cross-sectional view of a bonded multilayer-type diffractive optical element that shows the concept of the diffractive optical element of the present invention. The diffractive optical element 1 of this embodiment has a shape in which a first ultraviolet curing resin 10 and a second ultraviolet curing resin 20, which are mutually different ultraviolet curing resins, make contact with one another via the same diffraction grating groove 30. Further, in this embodiment, the diffraction grating groove 30 is formed in a saw shape as shown in the drawings but the present invention is not limited to such a saw shape.

In rendering a diffractive optical element 1 with such a shape, fabrication is possible by using only one die to form the diffraction grating groove 30 and, as a result, the work involved in fabricating and aligning two conventional diffraction grating grooves separately is not required. Further, here, by using the first ultraviolet curing resin 10 and second ultraviolet curing resin 20, in addition to fabrication being possible simply by repeating work such as dropping the material in the die and solidifying the material, mass productivity improves. Further, by sticking the first ultraviolet curing resin 10 and second ultraviolet curing resin 20 together, the effect of detachment in the diffraction grating groove 30 is largely prevented.

In the case of the diffractive optical element 1 of the present invention, the material of the first ultraviolet curing resin 10 preferably satisfies Expressions (1) and (2) below when the refractive index at line d is nd1 and the dispersion value for the first ultraviolet curing resin 10 is vd1 and the material of the second ultraviolet curing resin 20 preferably satisfies Expressions (3) and (4) when the refractive index at line d is nd2 and the dispersion value for the second ultraviolet curing resin 20 is vd2.

$$1.50 \leq nd1 \leq 1.60 \tag{1}$$

$$45 \leq vd1 \leq 65 \tag{2}$$

$$1.45 \leq nd2 \leq 1.55 \tag{3}$$

$$vd2 \leq 45 \tag{4}$$

The conditional expressions (1), (2), (3), and (4) are conditions to enable different ultraviolet curing resins (the first ultraviolet curing resin 10 and second ultraviolet curing resin 20 here) to make contact with one another via a common diffraction grating groove 30 (to enable the diffraction grating groove 30 to be formed) with superior performance. That is, when the ranges specified by these conditional expressions (1) to (4) are removed, it is difficult to obtain the shape of the multilayer-type diffractive optical element 1 of the present invention (mutually different materials make contact with one another via the same diffraction grating groove). In particular, conditional expressions (1) and (3) serve to favorably preserve the angle characteristic and conditional expressions (2) and (4) serve to obtain a favorable diffraction efficiency over the full wavelength range.

Here, the lower limit value of conditional expression (1) is preferably 1.55. Further, the upper limit value of the conditional expression (1) is preferably 1.60. The lower limit value of conditional expression (2) is preferably 47. Further, the upper limit value of conditional expression (2) is preferably 55. The lower limit value of conditional expression (3) is preferably 1.50. Further, the upper limit value of conditional expression (3) is preferably 1.54. The lower limit value of conditional expression (4) is preferably 30. Further, the upper limit value of conditional expression (4) is preferably 45.

In addition, in the case of the diffractive optical element 1 of the present invention, the material of the first ultraviolet curing resin 10 preferably satisfies Expression (5) below when the refractive index at line d is nd1 and the dispersion value of the first ultraviolet curing resin 10 is vd1 and the material of the second ultraviolet curing resin 20 preferably satisfies Expression (5) below when the refractive index at line d is nd2 and the dispersion value of the second ultraviolet curing resin 20 is vd2.

$$0.0005 \leq (nd1-nd2)/(vd1-vd2) \leq 0.03 \tag{5}$$

Conditional expression (5) is a condition that specifies the difference in the refractive index and the difference in the dispersion value between the first ultraviolet curing resin 10 and second ultraviolet curing resin 20. When the specified ranges of this conditional expression (5) and conditional expression (6) (that is described subsequently) are removed, there is then the inconvenience that height h of the diffraction grating groove 30 is high and the diffraction efficiency with respect to a variety of wavelengths drops even given the shape of the multilayer-type diffractive optical element in which mutually different materials (ultraviolet curing resins) make contact with one another via the same diffraction grating groove 30 as per the present invention. Here, the lower limit value of conditional expression (5) is preferably 0.001. Further, the upper limit value of conditional expression (5) is preferably 0.005.

Further, in the case of the diffractive optical element 1 of the present invention, Expression (6) below is preferably satisfied when the height of the diffraction grating groove is h.

$$h \leq 50 \, \mu m \tag{6}$$

Conditional expression (6) is a condition relating to the angle characteristic (the extent of the drop in the diffraction efficiency with respect to a change in the angle of incidence of the incident light beam) and, by satisfying this condition, the angle characteristic can be improved in comparison with that of a conventional multilayer-type diffractive optical element. That is, by reducing the height of the diffraction grating groove 30 by making the height h of the diffraction grating groove 30 no more than the upper limit value (50 μm) of conditional expression (6) and reducing the height of the diffraction grating groove 30, the angle characteristic can be improved by reducing the loss during light transmission. However, because it is possible that reducing the value of height h without limit does not allow the strict fabrication accuracy to be satisfied, the lower limit value is preferably provided for height h in conditional expression (6). Here, more favorable results are obtained when the upper limit value of conditional expression (6) is 30.0 μm.

Furthermore, in the case of the diffractive optical element 1 of the present invention, by making the pitch (minimum pitch) p (See FIG. 1) of the diffraction grating groove 30 large at 80 μm or more, the vertical angle θ (See FIG. 1) of the diffraction grating groove 30 can be made moderate. Thus, if the vertical angle θ of the diffraction grating groove 30 is made moderate, as described subsequently, the shape can be accurately transferred when the first ultraviolet curing resin 10 is molded by using a first die 50 and, because the second ultraviolet curing resin 20 dropped onto the transfer-molded diffraction grating groove 30 is adequately diffused to the hollow part of the diffraction grating groove 30 formed on (transferred to) the first ultraviolet curing resin 10, a diffraction grating groove 30 with a predetermined shape can be easily formed and the productivity of the diffractive optical element 1 can be improved. Further, if the pitch (minimum pitch) p of the diffraction grating groove 30 is made even larger at 100 μm, the vertical angle θ of the diffraction grating groove 30 is even more moderate and, therefore, the formation of the diffraction grating groove 30 is even more straightforward.

Further, because the spectroscopic transmittance characteristic of ultraviolet curing resin is generally not very favorable, when the thickness on the optical axis of the ultraviolet curing resin constituting the diffractive optical element is large, the transmittance of the overall optical system decreases. The trend is prominent in the short wavelength range in particular. As a result, in the case of the diffractive optical element 1 of the present invention, the sum of the thicknesses on the optical axis of the first ultraviolet curing resin 10 and second ultraviolet curing resin 20 is preferably no more than 1000 μm. Further, the first ultraviolet curing resin 10 and second ultraviolet curing resin 20 both preferably have a thickness on the optical axis of no more than 500 μm. Thus, by suppressing the thickness on the optical axis of the first ultraviolet curing resin 10 and second ultraviolet curing resin 20, the usage amount of ultraviolet curing resin that is used as material is then lower than conventional amounts used, and there is therefore the convenience of the associated reduced costs.

Further, the diffractive optical element 1 of the present invention desirably satisfies Expression (7) below when the core thickness of the first ultraviolet curing resin 10 is t1 and the core thickness of the second ultraviolet curing resin 20 is t2.

$$0.2 < t1/t2 < 5.0 \tag{7}$$

When the upper limit of conditional expression (7) is increased, core thickness t1 in the optical axis direction of the first ultraviolet curing resin 10 is too thick and, because the total weight of the first ultraviolet curing resin increases, there is the inconvenience that detachment from the substrate (glass substrate or the like, for example) constituting the diffractive optical element 1 readily occurs. Further, when the lower limit value of conditional expression (7) is reduced, the core thickness t2 in the optical axis direction of the second ultraviolet curing resin 20 is too thick and a large stress acts on the first ultraviolet curing resin 10, which produces the inconvenience that detachment of the first ultraviolet curing resin 10 and second ultraviolet curing resin 20 readily occurs. Further, when the layer of either of the first ultraviolet curing resin 10 and second ultraviolet curing resin 20 is too thick, the time required to cure the resin through irradiation with ultraviolet light is also long, and there is a risk of an increase in production costs, which is not favorable.

Further, the diffractive optical element 1 of the present invention preferably satisfies Expression (8) below when the radius of curvature of the above substrate (glass, for example) is R.

$$0 \leq 1/R < 0.1 (1/mm) \tag{8}$$

When the upper limit value of conditional expression (8) is increased, the radius of curvature R of the substrate is too small and there is the inconvenience that adhesion with the first ultraviolet curing resin 10 deteriorates and detachment readily occurs. Further, when the substrate of the diffractive optical element 1 is a flat plate, processing of the substrate is easy to perform and the first ultraviolet curing resin 10, which is bonded to the flat plate, is also readily molded and bonded and so forth. As a result, the value of the radius of curvature R of the substrate is set without limit and the lower limit value of the conditional expression (8) is 0.

Here, the basis of selection of the mutually different materials constituting the diffractive optical element 1 of the present invention, that is, the first optical material and second optical material will be described. Further, it is assumed that the first optical material employs a material of a high refractive index and low dispersion and the second optical material uses a material of a low refractive index and high dispersion. In addition, the first optical material and second optical material are arranged in the order of the light propagation direction. Here, the highs and lows of the refractive index and dispersion are relative.

In the case of the diffractive optical element 1 of the present invention, when the design wavelength is line d, the refractive indices with respect to line d of the first and second optical materials are nd1 and nd2 respectively, the grating height is h, and the wavelength of line d is λd, it is assumed that Expression (9) below is satisfied.

$$(nd1-nd2)h=\lambda d \quad (9)$$

Because Expression (9) is an expression for the braze condition of line d and the diffraction efficiency with respect to λd is then maximum. Here, if nd1, nd2 and λd are provided, the grating height h is determined with certainty and can be expressed as per Expression (10) below.

$$h=\lambda d/(nd1-nd2) \quad (10)$$

Further, the diffractive optical element 1 of the present invention desirably satisfies the braze condition even for wavelengths other than that of line d in order to obtain a favorable diffraction efficiency in a wide wavelength range in particular (white light and so forth). Therefore, lines C and F are selected as wavelengths other than line d and it is assumed that Expressions (11) and (12) below, which are expressions for the braze condition of lines C and F are satisfied when the refractive indices with respect to lines C and F of an ith optical material (i=1 and 2) are nCi and nFi respectively and the wavelengths of lines C and F are λC and λF.

$$(nC1-nC2)h=\lambda C \quad (11)$$

$$(nF1-nF2)h=\lambda F \quad (12)$$

When Expression (11) is derived from Expression (12) above, Expression (13) below is obtained.

$$(nF1-nF2)h-(nC1-nC2)h=\lambda F-\lambda C \quad (13)$$

When Expression (13) is re-arranged, Expression (14) below is obtained.

$$\{(nF1-nF2)-(nC1-nC2)\}=(\lambda F-\lambda C)/h \quad (14)$$

Here, when h is removed from Expression (14) by using Expression (10), Expression (15) below is obtained.

$$\{(nF1-nF2)-(nC1-nC2)\}=(\lambda F-\lambda C)\cdot(nd1-nd2)/\lambda d \quad (15)$$

In addition, when Expression (15) above is re-arranged, same can be represented by Expression (16) below.

$$(nd1-nd2)/\{(nF1-nF2)-(nC1-nC2)\}=\lambda d/(\lambda F-\lambda C) \quad (16)$$

When λd=0.587562 μm, λF=0.486133 μm, λC=0.656273 μm are substituted into the right side of Expression (16) above, Expression (17) is obtained.

$$(nd1-nd2)/\{(nF1-nF2)-(nC1-nC2)\}=-3.453403 \quad (17)$$

Supposing that Δnd=nd1−nd2, {(nF1−nF2)−(nC1−nC2)}={(nF1−nC1)−(nF2−nC2)}=Δ(nF−nC) in Expression (17) above, same can be expressed as per Expression (18).

$$\Delta nd/\Delta(nF-nC)=-3.453403 \quad (18)$$

The right side of Expression (18) above is a value (the Abbe number of the diffractive optical element) determined by the selected wavelength (here, lines d, C, and F) and it is shown that the first optical material and second optical material constituting the diffractive optical element 1 of the present invention may be selected for the best possible approximation to the relation of Expression (18). More specifically, a combination of the first optical material and second optical material so that Expression (18) is satisfied as far as possible may be selected on the (nF−nC)/nd map shown in FIG. 7. By using an optical material that is selected based on the basis of selection, the diffractive optical element 1 of the present invention is able to obtain a favorable diffraction efficiency in a wide wavelength range. Further, the diffractive optical element of the first and second embodiments (described subsequently) employ an optical material based on the basis of selection as indicated by (1) to (3) of FIG. 7. Further, in FIG. 7, the relation of Expression (18) is shown by straight lines A and B as an example.

Further, conditional Expression (18) preferably satisfies the range indicated by Expression (19) below.

$$-10.0<\Delta nd/\Delta(nF-nC)<-1.0 \quad (19)$$

Conditional Expression (19) is a condition for further improving the diffraction efficiency in a wide wavelength range of the diffractive optical element 1. By satisfying conditional Expression (19), practical performance can be adequately obtained. On the other hand, when the upper limit value of conditional expression (19) is raised or the lower limit value thereof is lowered, there is the inconvenience that a flat diffraction efficiency is not obtained over a wide wavelength range and, as a result, there is the problem that a large amount of flare caused by diffracted light is produced and the image quality is harmed, and so forth. Further, in the case of the diffractive optical element 1, in order to obtain a higher result, conditional expression (19) preferably has a range of −3.0 to −9.0.

Further, in the case of the diffractive optical element of the present invention, materials used for the first ultraviolet curing resin (high refractive index and low dispersion material) include, specifically, ultraviolet curing resins comprising an enthiol reaction product of an acrylate with a fat ring and a thiol compound. Further, materials used for the second ultraviolet curing resin (low refractive index and high dispersion material) include, specifically, an ultraviolet curing resin comprising a mixture of an acrylate with a plurality of benzene skeletons in the molecule and an acrylate containing a fluorine atom in the molecule. The highs and low of the refractive index and dispersion mentioned here are relative.

The fabrication procedure for the diffractive optical element 1 (disk-shaped in this embodiment) of the present invention will be described hereinbelow. Here, a first die 50 in which a diffraction grating groove 30 of a predetermined shape is pre-formed and a glass substrate 60 in which a predetermined face is pre-formed (that is, a material that transmits ultraviolet light UV that will be described subsequently) are prepared. Further, a first ultraviolet curing resin 10' that is flexible when heated sufficiently is prepared. Resins appearing in subsequent embodiments may be used as the first ultraviolet curing resin 10'.

Figure 2A:
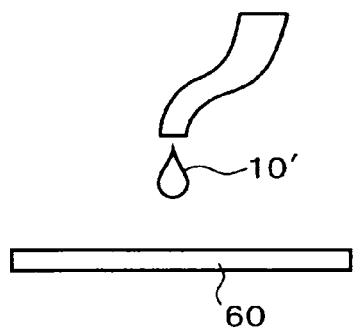
FIG. 2 shows the steps of fabricating the diffractive optical element of the present invention in the order (A) to (H)
Figure 2E:
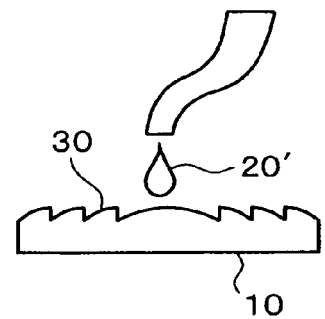
Figure 2B:
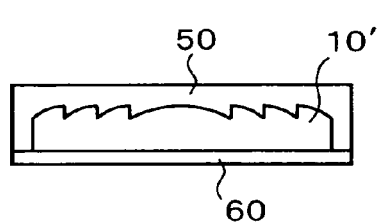
Figure 2F:
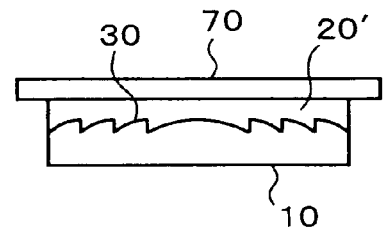
Figure 2C:
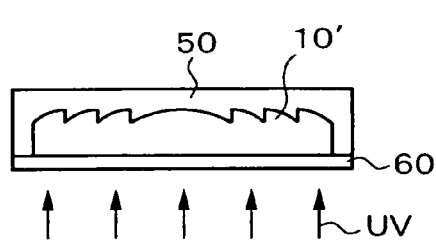
Figure 2G:
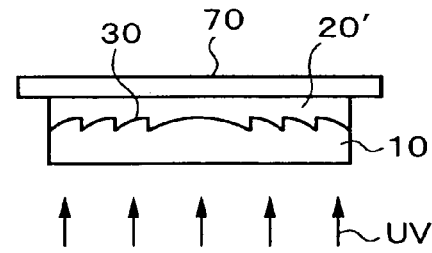
Figure 2D:
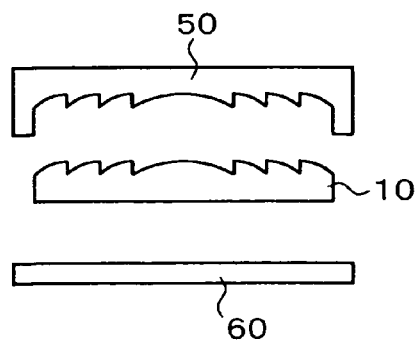

Thereafter, the first ultraviolet curing resin 10' that is flexible when heated sufficiently is dropped onto the glass substrate 60 (See FIG. 2(A)). Further, the first die 50 for forming the diffraction grating groove 30 is pushed against the dropped first ultraviolet curing resin 10' (See FIG. 2(B)). In addition, the first ultraviolet curing resin 10' is cured through irradiation with the ultraviolet light UV from the side of the glass substrate 60 (See FIG. 2C). Further, the cured first ultraviolet curing resin 10' is removed from the first die 50 and glass substrate 60 (See FIG. 2D). As a result, the shape of the diffraction grating groove 30 formed in the first die 50 is transferred to the first ultraviolet curing resin 10' to form a first diffractive optical element 10.

Figure 2H:
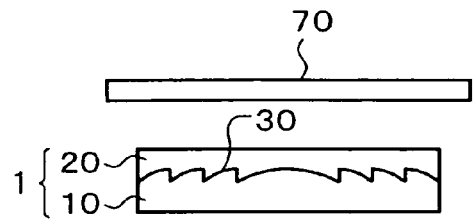

Thereafter, a liquid second ultraviolet curing resin 20' is dropped in a suitable amount onto the surface where the diffraction grating groove 30 is formed of the first diffractive optical element 10 that was fabricated as mentioned above (See FIG. 2E). The resins appearing in subsequently embodiments may be used as the second ultraviolet curing resin 20'. A face-forming second die 70 is pressed against the face opposite the face where the diffraction grating groove 30 is formed in the dropped second ultraviolet curing resin 20' (See FIG. 2F). In addition, the second ultraviolet curing resin 20' is cured through irradiation with ultraviolet light UV (See FIG. 2G). As a result, a second diffractive optical element 20 that is bonded to the first diffractive optical element 10 is formed. Finally, if the face-forming second die 70 is removed, the bonded multilayer-type diffractive optical element 1 according to the present invention that is constituted by the first diffractive optical element (first ultraviolet curing resin) 10 and second diffractive optical element (second ultraviolet curing resin) 20 is finished (See FIG. 2H).

While the method of fabricating the diffractive optical element 1 is a method of fabricating a multilayer-type diffractive optical element, among all the steps, the step of forming the diffraction grating groove is only a step of forming the diffraction grating groove 30 in the first diffractive optical element (first ultraviolet curing resin) 10 and there may be one die that must be formed beforehand (here, this is the first die 50). As a result, the fabrication steps of the method of fabricating the diffractive optical element of the present invention are simple and a bonded multilayer-type diffractive optical element can be fabricated at low cost.

Figure 3A:
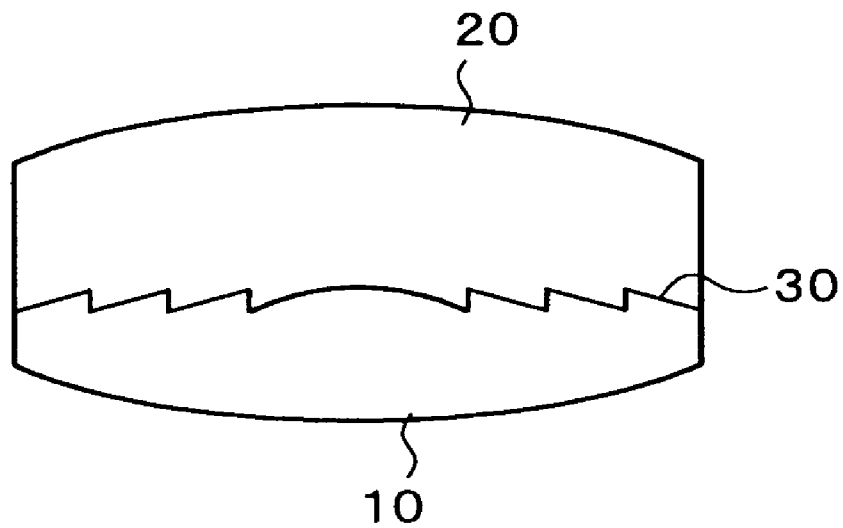
FIG. 3 shows a modified example of the diffractive optical element of the present invention, wherein (A) and (B) show a case where a diffraction grating groove is formed in a curved face.
Figure 3B:
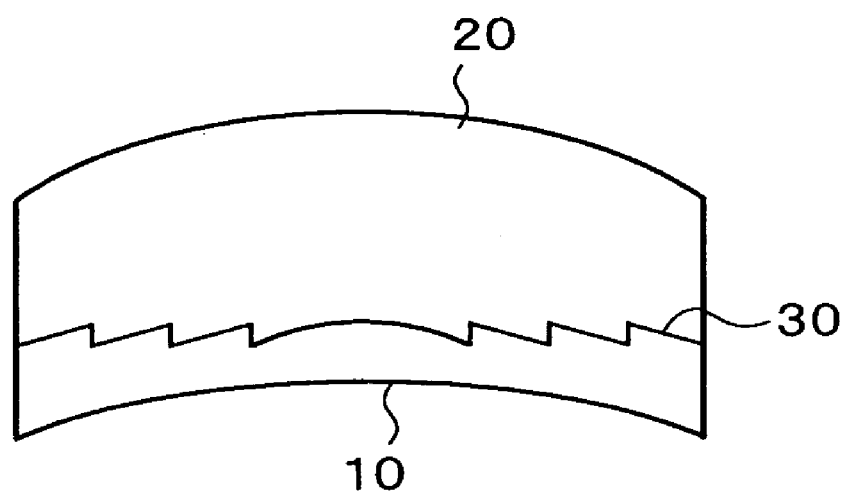

Further, the diffractive optical element of the present invention is not limited to the embodiment above. For example, the diffraction grating groove of the diffractive optical element may be formed in a curved face rather than a flat face as per the above embodiment. Here, FIG. 3A shows an example where the diffraction grating groove 30 is formed in a curved face with a convex shape and FIG. 3B shows an example where the diffraction grating groove 30 is formed in a curved face with a concave shape.

In addition, the diffractive optical element of the present invention can be used as a lens to focus diffracted light of a specified degree to one point and, in this case, the diffractive optical element is made to have a disk shape overall. Further, the cross-sectional shape of the diffractive optical element may take the form of a flat parallel plate as shown in FIG. 1 or a lens shape as shown in FIGS. 3A and 3B.

FIRST EXAMPLE

In this Example, the refractive index nd1 of the first ultraviolet curing resin 10 was 1.55349, the dispersion value vd1 was 50.41 (point (1) in FIG. 7), the refractive index nd2 of the second ultraviolet curing resin 20 was 1.52409, the dispersion value vd2 was 36.32 (point (2) in FIG. 7), the height h of the diffraction grating groove 30 was 20 μm, the core thickness t1 of the first ultraviolet curing resin was 100 μm, the core thickness t2 of the second ultraviolet curing resin was 200 μm, and the angle of curvature R of the substrate was +12 mm. Table 1 below shows values corresponding with the conditional expressions (1) to (8) and (19) of the first Example.

TABLE 1

| |
|---|
| (1) nd1 = 1.55349 |
| (2) vd1 = 50.41 (nF1 − nC1 = 0.01098) |
| (3) nd2 = 1.52409 |
| (4) vd2 = 36.32 (nF2 − nC2 = 0.01443) |
| (5) (nd1 − nd2)/(vd1 − vd2) = 0.0020866 |
| (6) h = 20 μm |
| (7) t1/t2 = 2.0 |
| (8) 1/R = 0.08333 |
| (19) Δnd/Δ(nF − nC) = −8.52174 |

Figure 4:
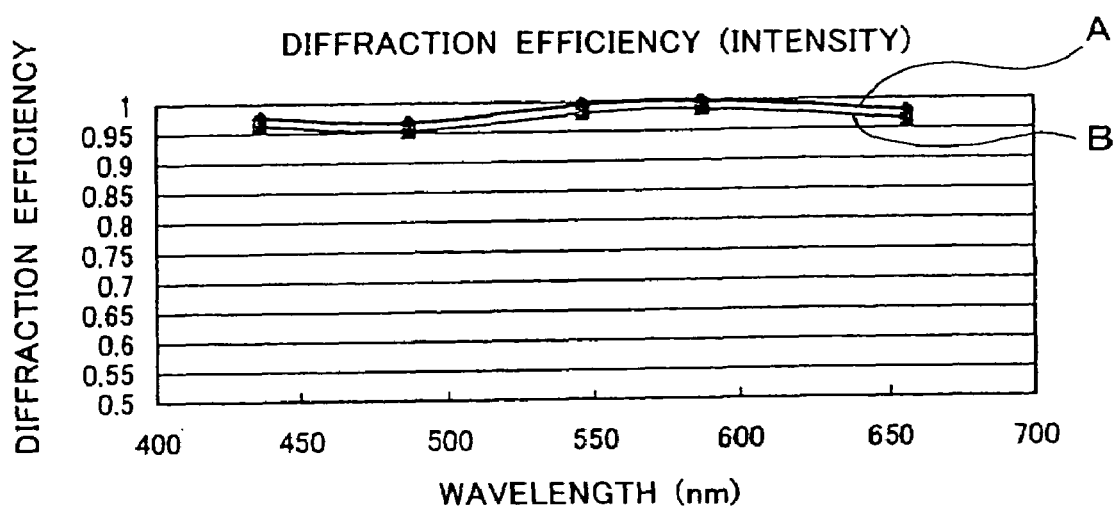
FIG. 4 shows the diffraction efficiency with respect to each wavelength of the diffractive optical element of a first embodiment.

Thus, it can be seen that, in this embodiment, all of conditional expressions (1) to (8) and (19) are satisfied. The curved lines A and B shown in FIG. 4 show the diffraction efficiency in cases where curved line A enters at an angle of incidence of 0° with respect to the diffraction grating and in cases where curved line B enters at an angle of incidence of 4.586° with respect to the diffraction grating respectively, which is when the height of the respective diffraction grating groove is established so that the diffraction efficiency is 100% for line d (wavelength λ=587.562 nm). The diffractive optical element of this embodiment, which has such a constitution, was capable of obtaining high diffraction efficiency (light intensity) of at least 0.97 in the wavelength range from line g to line C.

SECOND EXAMPLE

In this Example, the refractive index nd1 of the first ultraviolet curing resin 10 was 1.55349, the dispersion value vd1 was 50.41 (point (1) in FIG. 7), the refractive index nd2 of the second ultraviolet curing resin 20 was 1.52987, the dispersion value vd2 was 35.44 (point (3) in FIG. 7), the height h of the diffraction grating groove 30 was 25 μm, the core thickness t1 of the first ultraviolet curing resin was 200 μm, the core thickness t2 of the second ultraviolet curing resin was 100 μm, and the angle of curvature R of the substrate was +300 mm. Table 2 below shows values corresponding with the conditional expressions (1) to (8) and (19) of the second Example.

TABLE 2

| |
|---|
| (1) nd1 = 1.55349 |
| (2) vd1 = 50.41 (nF1 − nC1 = 0.01098) |
| (3) nd2 = 1.52987 |
| (4) vd2 = 35.44 (nF2 − nC2 = 0.01495) |
| (5) (nd1 − nd2)/(vd1 − vd2) = 0.0015778 |
| (6) h = 25 μm |
| (7) t1/t2 = 0.5 |
| (8) 1/R = 0.003333 |
| (19) Δnd/Δ(nF − nC) = −5.94962 |

Figure 5:
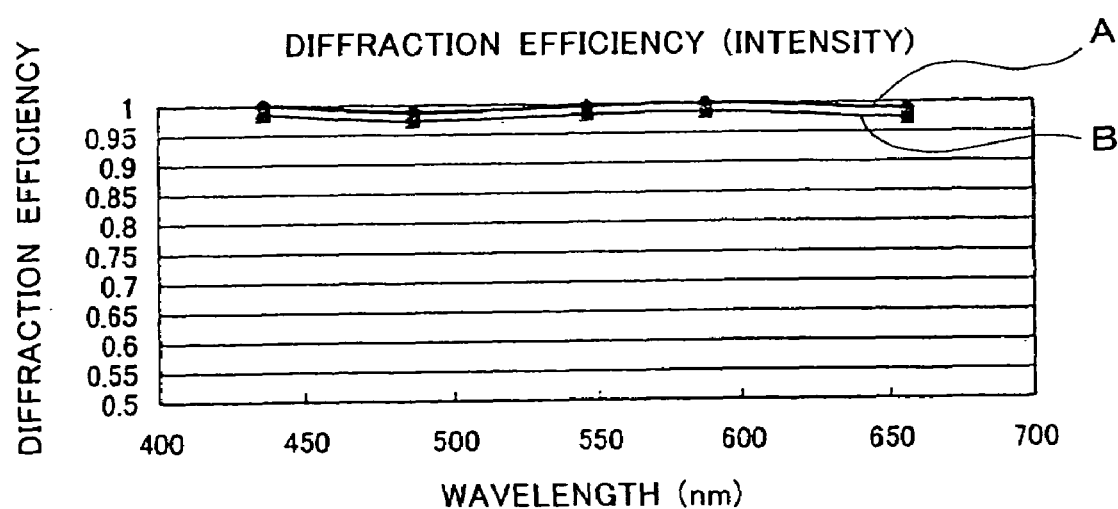
FIG. 5 shows the diffraction efficiency with respect to each wavelength of the diffractive optical element of a second embodiment.
Figure 6:
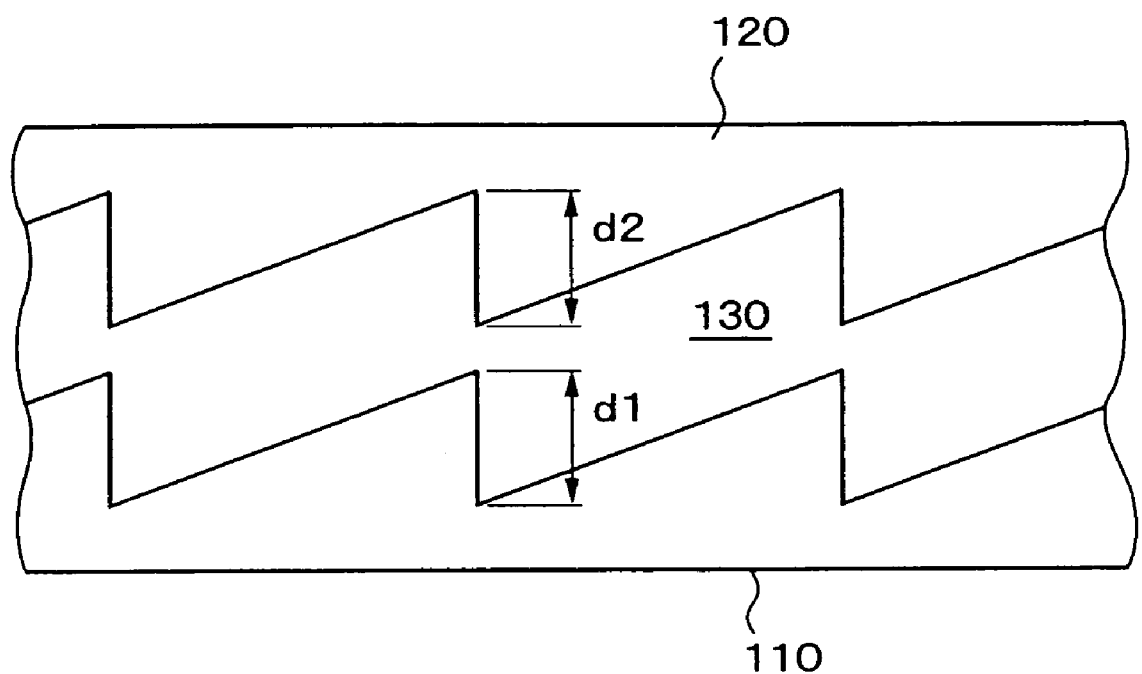
FIG. 6 is a schematic cross-sectional view of a conventional multilayer-type diffraction grating.

Thus, it can be seen that, in this embodiment, all of conditional expressions (1) to (8) and (19) are satisfied. The curved lines A and B shown in FIG. 5 show the diffraction efficiency in cases where curved line A enters at an angle of incidence of 0° with respect to the diffraction grating and in cases where curved line B enters at an angle of incidence of 4.586° with respect to the diffraction grating respectively, which is when the height of the respective diffraction grating groove is established so that the diffraction efficiency is 100% for line d (wavelength λ=587.562 nm). The diffractive optical element of this embodiment, which has such a constitution, was capable of obtaining high diffraction efficiency (light intensity) of at least 0.95 in the wavelength range from line g to line C.

What is claimed is:

1. A diffractive optical element in which mutually different materials make contact with one another via the same diffraction grating groove, wherein one of the mutually different materials is a first ultraviolet curing resin and the other of the mutually different materials is a second ultraviolet curing resin that is different from the first ultraviolet curing resin, wherein, when the refractive index at line d of the first ultraviolet curing resin is nd1, the dispersion value of the first ultraviolet curing resin is vd1, the refractive index at line d of the second ultraviolet curing resin is nd2, and the dispersion value of the second ultraviolet curing resin is vd2, the condition of expression $$0.0015778 \leq (nd1-nd2)/(vd1-vd2) \leq 0.03$$

is satisfied.

2. The diffractive optical element according to claim 1, wherein, when the refractive index at line d of the first ultraviolet curing resin is nd1 and the dispersion value of the first ultraviolet curing resin is vd1, the conditions of expressions $$1.50 \leq nd1 \leq 1.60$$

$$45 \leq vd1 \leq 65$$

are satisfied and, when the refractive index at line d of the second ultraviolet curing resin is nd2 and the dispersion value of the second ultraviolet curing resin is vd2, the conditions of expressions $$1.45 \leq nd2 \leq 1.55$$

$$vd2 \leq 45$$

are satisfied.

3. The diffractive optical element according to claim 2, wherein, when the height of the diffraction grating groove is h, the condition of expression $$h \leq 50 \ \mu m$$

is satisfied.

4. The diffractive optical element according to claim 3, wherein the minimum pitch of the diffractive optical element is at least 80 μm.

5. The diffractive optical element according to claim 4, wherein the sum of the thicknesses on the optical axis of the first ultraviolet curing resin and the second ultraviolet curing resin is no more than 1000 μm.

6. The diffractive optical element according to claim 5, wherein the first ultraviolet curing resin and second ultraviolet curing resin both have a thickness of no more than 500 μm.

7. The diffractive optical element according to claim 6, wherein, when the thickness of the first ultraviolet curing resin is t1 and the thickness of the second ultraviolet curing resin is t2, the condition of expression $$0.2 < t1/t2 < 5.0$$

is satisfied.

8. The diffractive optical element according to claim 7, wherein, when the radius of curvature of a substrate that constitutes the diffractive optical element having the first ultraviolet curing resin is R, the condition of expression $$0 \leq 1/R < 0.1 (1/mm)$$

is satisfied.

9. The diffractive optical element according to claim 2, wherein, when the refractive index at line d of the first ultraviolet curing resin is nd1, the refractive index at line C is nC1, and the refractive index at line F is nF1, and the refractive index at line d of the second ultraviolet curing resin is nd2, the refractive index at line C is nC2, the refractive index at line F is nF2, and $\Delta nd = nd1 - nd2$, $\Delta(nF-nC) = \{(nF1-nC1)-(nF2-nC2)\}$, the condition of expression $$-10.0 < \Delta nd/\Delta(nF-nC) < -1.0$$

is satisfied.

10. The diffractive optical element according to claim 9, wherein, when the height of the diffraction grating groove is h, the condition of expression $$h \leq 50 \ \mu m$$

is satisfied.

11. The diffractive optical element according to claim 1, wherein, when the height of the diffraction grating groove is h, the condition of expression $$h \leq 50 \ \mu m$$

is satisfied.

12. The diffractive optical element according to claim 1, wherein the minimum pitch of the diffractive optical element is at least 80 μm.

13. The diffractive optical element according to claim 1, wherein the sum of the thicknesses on the optical axis of the first ultraviolet curing resin and the second ultraviolet curing resin is no more than 1000 μm.

14. The diffractive optical element according to claim 1, wherein the first ultraviolet curing resin and second ultraviolet curing resin both have a thickness of no more than 500 μm.

15. The diffractive optical element according to claim 1, wherein, when the thickness of the first ultraviolet curing resin is t1 and the thickness of the second ultraviolet curing resin is t2, the condition of expression $$0.2 < t1/t2 < 5.0$$

is satisfied.

16. The diffractive optical element according to claim 1, wherein, when the radius of curvature of a substrate that constitutes the diffractive optical element having the first ultraviolet curing resin is R, the condition of expression $$0 \leq 1/R < 0.1 (1/mm)$$

is satisfied.

17. The diffractive optical element according to claim 1, wherein, when the refractive index at line d of the first ultraviolet curing resin is nd1, the refractive index at line C is nC1, and the refractive index at line F is nF1, and the refractive index at line d of the second ultraviolet curing resin is nd2, the refractive index at line C is nC2, the refractive index at line F is nF2, and $\Delta nd = nd1 - nd2$, $\Delta(nF-nC) = \{(nF1-nC1)-(nF2-nC2)\}$, the condition of expression $$-10.0 < \Delta nd/\Delta(nF-nC) < -1.0$$

is satisfied.

18. The diffractive optical element according to claim 17, wherein, when the height of the diffraction grating groove is h, the condition of expression $$h \leq 50 \ \mu m$$

is satisfied.

19. The diffractive optical element according to claim 1, wherein said first ultraviolet curing resin comprises an enthiol reaction product of an acrylate with a fat ring and a thiol compound, and said second ultraviolet curing resin comprises a mixture of an acrylate with a plurality of benzene skeletons in the molecule and an acrylate containing a fluorine atom in the molecule.

20. The diffractive optical element according to claim 1, wherein said diffraction grating groove is formed in a flat face.

21. The diffractive optical element according to claim 1, wherein said diffraction grating groove is formed in a curved face.

22. The diffractive optical element according to claim 21, wherein said curved face comprises a convex shape.

23. The diffractive optical element according to claim 21, wherein said curved face comprises a concave shape.

* * * * *